(12) United States Patent
Garner et al.

(10) Patent No.: US 9,861,030 B2
(45) Date of Patent: Jan. 9, 2018

(54) BIASED GUIDE TO REDUCE VARIATION IN A VOLUMETRIC METER

(71) Applicant: Deere & Company, Moline, IL (US)

(72) Inventors: Elijah B. Garner, Bettendorf, IA (US);
Matthew David Arnold, Moline, IL (US); Drew M. Whitcomb, Bettendorf, IA (US)

(73) Assignee: Deere & Company, Moline, IL (US)

( * ) Notice: Subject to any disclaimer, the term of this patent is extended or adjusted under 35 U.S.C. 154(b) by 125 days.

(21) Appl. No.: 14/862,560

(22) Filed: Sep. 23, 2015

(65) Prior Publication Data

US 2017/0079199 A1    Mar. 23, 2017

(51) Int. Cl.
*A01C 7/12* (2006.01)
*A01C 7/08* (2006.01)

(52) U.S. Cl.
CPC .............. *A01C 7/127* (2013.01); *A01C 7/082* (2013.01); *A01C 7/12* (2013.01); *A01C 7/125* (2013.01); *A01C 7/126* (2013.01)

(58) Field of Classification Search
USPC ......... 111/178, 182; 222/288, 293–295, 312, 222/313
See application file for complete search history.

(56) References Cited

U.S. PATENT DOCUMENTS

| 1,712,797 | A | * | 5/1929 | Johnston | A01C 7/121 |
| | | | | | 222/268 |
| 2,757,825 | A | | 8/1956 | Buhr | |
| 4,131,221 | A | | 12/1978 | Yeager | |
| 6,109,192 | A | | 8/2000 | Foley et al. | |
| 6,158,630 | A | * | 12/2000 | Mayerle | G01F 13/001 |
| | | | | | 222/413 |
| 6,308,645 | B1 | * | 10/2001 | Newkirk | A01C 7/126 |
| | | | | | 111/184 |
| 8,196,534 | B2 | | 6/2012 | Meyer et al. | |
| 2002/0029878 | A1 | * | 3/2002 | Victor | E21B 23/08 |
| | | | | | 166/70 |

FOREIGN PATENT DOCUMENTS

DE    8811286 U1    11/1988
EP    2260689 A1    12/2010

OTHER PUBLICATIONS

Extended EP Search Report Application No. 16189499.3, dated Sep. 2, 2017, 8 pages.

* cited by examiner

*Primary Examiner* — Alicia Torres
(74) *Attorney, Agent, or Firm* — Christopher J. Volkmann; Kelly, Molt & Christenson, PLLC

(57) ABSTRACT

A volumetric metering system for metering a product in an agricultural machine includes a roller element, a drive mechanism configured to rotationally drive the roller element to convey the product along a conveyance path to a product receiving component, and a guide element disposed on a side of the roller element. The guide element is configured to guide the product along the conveyance path, and is biased towards the roller element.

20 Claims, 7 Drawing Sheets

BIASED GUIDE TO REDUCE VARIATION IN A VOLUMETRIC METER

FIELD OF THE DISCLOSURE

The present disclosure relates to a volumetric meter. More specifically, but not by limitation, the present disclosure relates to a volumetric meter having a spring-loaded guide element for metering product in agricultural equipment.

BACKGROUND

Volumetric meters are commonly used in agricultural equipment, such as grain drills, air seeders or fertilizer applicators, to meter product (e.g. seed, fertilizer, etc.) during distribution. In one example, a volumetric meter employs one or more metering rollers contained within a housing. The housing has an inlet that receives product from a tank. The tank feeds the product into the housing utilizing a delivery mechanism (e.g. air, gravity, feed mechanisms, etc.). In one particular example, the tank is located above the housing and product is fed into the housing using gravity.

In one example, the metering rollers can be fluted such that, as the rollers rotate, product from the tank is carried to an outlet in a controlled manner. The rate at which product is conveyed to the outlet is based on the width of the roller, the size of the roller flutes, and the rotation speed of the rollers. From the outlet, the product is then carried by a distribution system for dispensing on or into the soil. In one example, the distribution system includes a number of individual channels or runs, each channel receiving product from a separate roller and delivering the product to a separate set of one or more ground openers.

The discussion above is merely provided for general background information and is not intended to be used as an aid in determining the scope of the claimed subject matter.

SUMMARY

A volumetric metering system for metering a product in an agricultural machine is presented. In one example, the volumetric metering system comprises a roller element, a drive mechanism configured to rotationally drive the roller element to convey the product along a conveyance path to a product receiving component, and a guide element disposed on a side of the roller element. The guide element is configured to guide the product along the conveyance path, and is biased towards the roller element.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
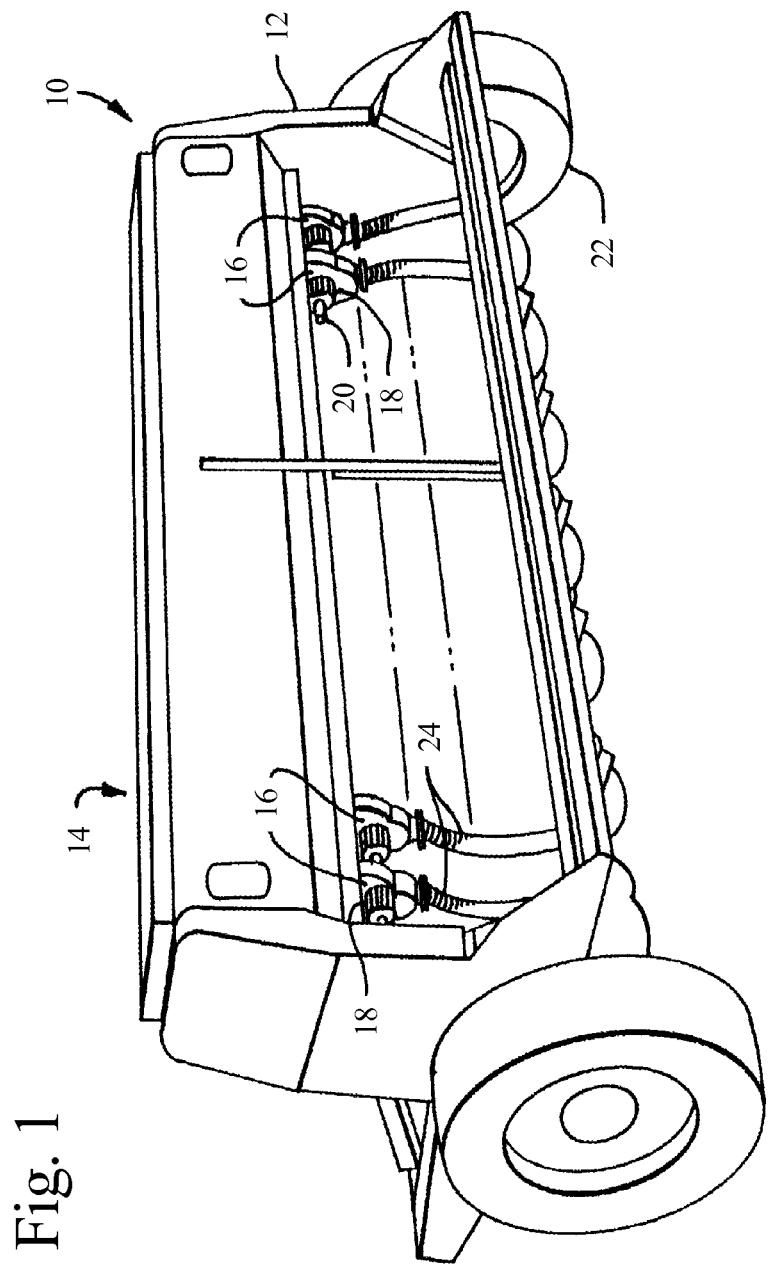
FIG. 1 illustrates a perspective view of a seeding implement, in one example.

FIG. 1 illustrates a perspective view of one example of a product distribution vehicle for distributing agricultural product in the form of particulate material (e.g. seed, fertilizer, etc.). In the illustrated example, the vehicle comprises a seeding implement 10 that delivers seed and/or fertilizer to ground engaging openers. Of course, other types of product distribution vehicles can be utilized.

Seeding implement 10 includes a frame 12 supporting a seed grain box 14. The grain box 14 opens downwardly into seed metering devices (e.g., fluted seed cups) designated generally at reference numeral 16. A plurality of transversely spaced fluted feed wheels or roller elements 18 are driven by a square drive shaft 20 using a drive mechanism. In one example, the drive mechanism comprises a separate motor, such as an electric motor. In the illustrated example, drive shaft 20 is operably connected to ground wheels 22 for metering a desired amount of seed into seed tubes 24 as the implement is towed forwardly through a field. The metering rate is proportional to the forward speed of the implement. In one example, the seeding rate can be changed by adjusting a ratio of a transmission located between ground wheels 22 and drive shaft 20. Of course, this is one example only. Other mechanism for changing the seeding rate can be utilized.

In one example, seed tubes 24 convey the product to ground openers that place the product in a furrow at a desired depth. Incorporation of seed row finishing equipment, such as closing wheels, can also be utilized.

Figure 2:
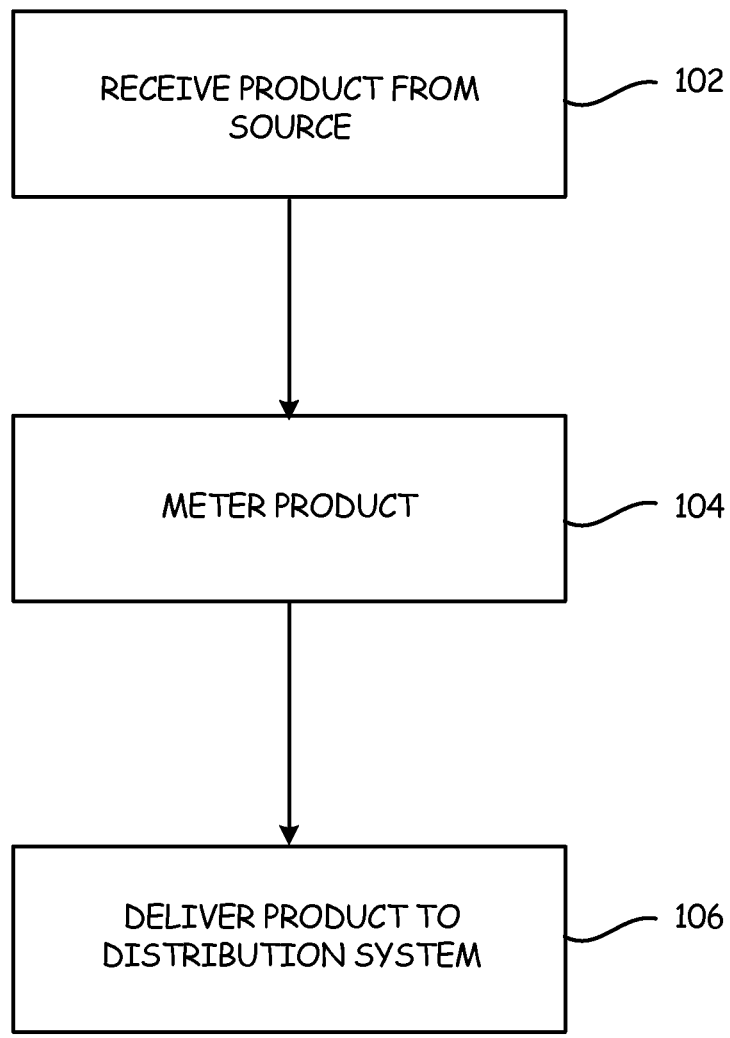
FIG. 2 illustrates a simplified block diagram for a metering process, in one example.

FIG. 2 illustrates a simplified block diagram for an example metering process. For example, the process of FIG. 2 can be performed using seeding implement 10 illustrated in FIG. 1.

In block 102, a metering system receives product (e.g., devices 16 receive seed and/or fertilizer) from a product source mechanism (e.g., grain box 14 or other source). In block 104, the metering system meters the product. Examples of this are described in greater detail below. Briefly, however, in one example one or more metering rollers are rotationally driven by a drive shaft or other drive mechanism. The metering rollers, which can be fluted, meter the product in a controlled manner by conveying the product to a product receiving mechanism at block 106. In one example, the product receiving mechanism comprises an outlet of the metering system that is coupled to an inlet of a distribution system (e.g., seed tubes of a gravity product distribution system, the air stream of distribution system, etc.).

In block 104, the rate at which product is conveyed to the outlet is based on the width of the roller, the size of the roller flutes, and the rotation speed of the rollers. For a given roller configuration, the metering rate can be adjusted by increasing or decreasing the rotation speed of the roller. In one example, to accommodate different types of product (e.g., different seed types, different fertilizer types, etc.) and/or significant variations in the desired product metering rate, the metering system is configured for use with different types of metering rollers. That is, the metering rollers can be removed and replaced with different roller sizes, shapes, etc.

For instance, a narrow roller can be used with crops that require a low application rate and a wider roller can be used with crops that require a high application rate.

Further, in one example, the metering system utilizes spacers positioned between adjacent rollers. The spacers can comprise sidewalls or plates that contact the sides of the rollers. In one example, the spacers form guide elements that are located in contact with, or otherwise in close proximity to, the rollers and aid in locating the rollers along the drive shaft and/or guiding the product along a conveyance path as the rollers rotate. In some scenarios, these types of metering components are susceptible to non-uniform product flow-rates. For example, roller geometry variations due to manufacturing tolerances or other reasons can cause unwanted variations in metering rates between the rollers. For instance, product can escape from or become lodged in gaps formed between the roller and spacer as a result of lateral run-out (i.e., side-to-side wobbling of the roller as it rotates). Further, mechanical binding between the rollers and spacers can increase power consumption and cause excessive wear on the associated components.

In accordance with one example, a metering system utilizes a guide element that is spring-loaded, or otherwise biased, toward the roller. As discussed in further detail below, the guide element can be biased in any of a number of ways. Briefly, however, the guide element can be biased by a compressible element, such as a compression spring or compressible material (e.g., a foam, polymer, etc.). The biased guide element can improve the functionality of a metering system, such as, but not limited to, mitigating the effects of roller geometry variations, reducing row-to-row product flow variation, reducing mechanical binding, reducing component wear, and/or reducing product damage, etc.

Figure 3:
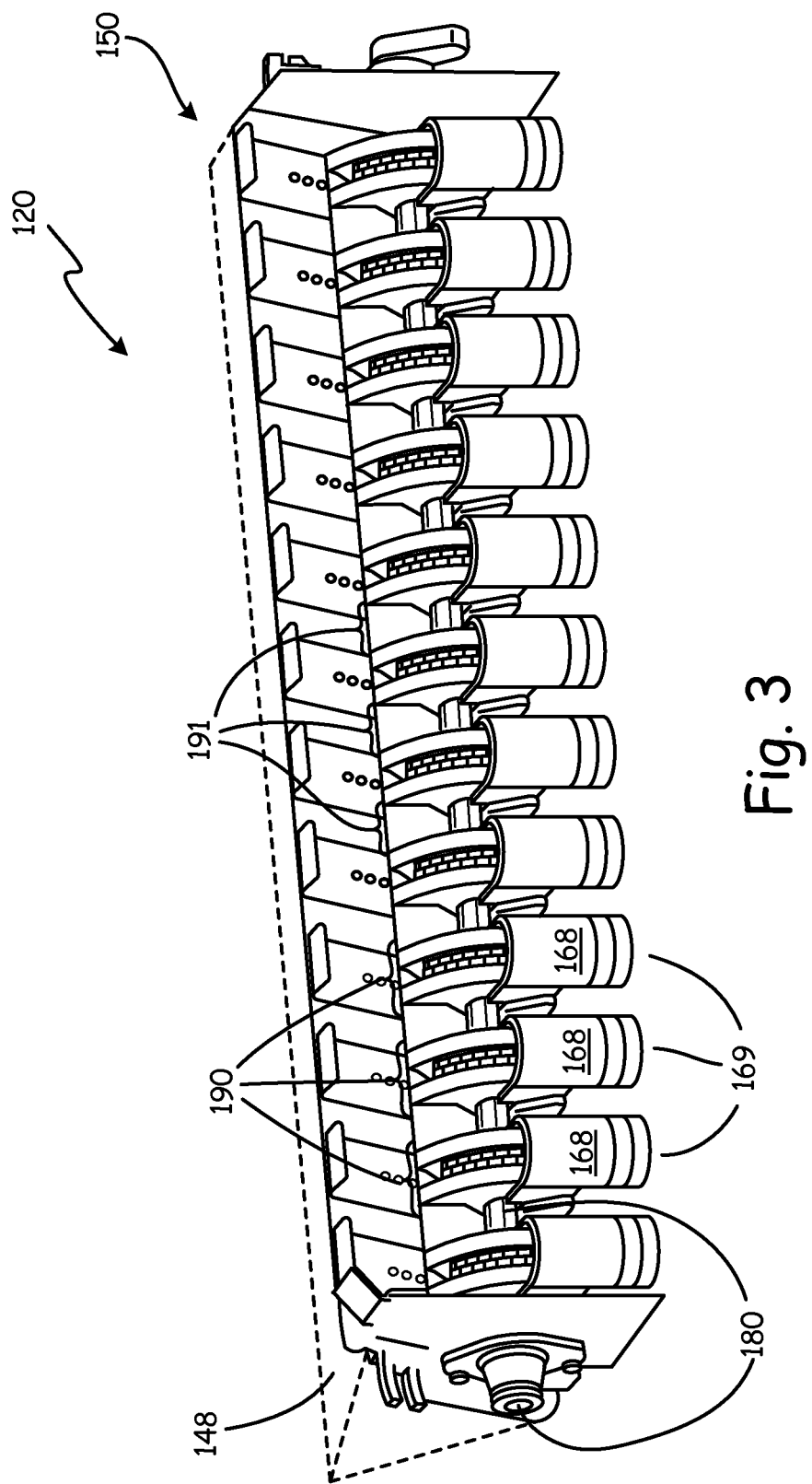
FIG. 3 illustrates a perspective view of a volumetric meter assembly, in one example.

FIG. 3 illustrates a perspective view of an example volumetric meter assembly 120 that is configured to volumetrically meter product and includes biased guide elements. In one example, assembly 120 can be utilized with a pneumatic distribution system, such as on an air seeder or air drill. That is, assembly 120 can be utilized to volumetrically meter product into air streams that pneumatically convey the product to the ground. In another example, assembly 120 can be utilized with a gravity drop distribution system. For the sake of illustration, but not by limitation, assembly 120 will be described in the context of seeding implement 10, shown in FIG. 1.

Assembly 120 includes a frame 150 that is located in a housing (not shown in FIG. 3) adjacent a lower outlet of a product tank (e.g., grain box 14). The product tank forms, or supplies a product (e.g., seed and/or fertilizer) into, a compartment 148 illustrated in FIG. 3 by dotted lines. A metering system drive shaft 180 is operably coupled to a drive assembly configured to rotate drive shaft 180. In one example, the drive assembly comprises a separate motor, such as an electric motor. In one example, the drive assembly comprises ground wheels.

Drive shaft 180 is supported by frame 150. A plurality of metering assemblies 190 are located along shaft 180. Each assembly 190 comprises a meter roller element that is rotated by shaft 180. In one example, the roller elements and the drive shaft 180 have corresponding cross section profiles that are non-circular (for example, square, hexagonal, octagonal or oval) to discourage slippage of the roller elements as shaft 180 rotates. Of course, the roller elements can be coupled to shaft 180 in other ways as well.

Adjacent each metering assembly 190 is a feed cup 168 which is open to the respective roller element, and configured to receive metered product. Each feed cup 168 also forms an outlet tube 169 configured to direct metered product to a product distribution system (not shown in FIG. 3). In one example, outlet tubes 169 are coupled to seed tubes (e.g., seed tubes 24 shown in FIG. 1).

Figure 4:
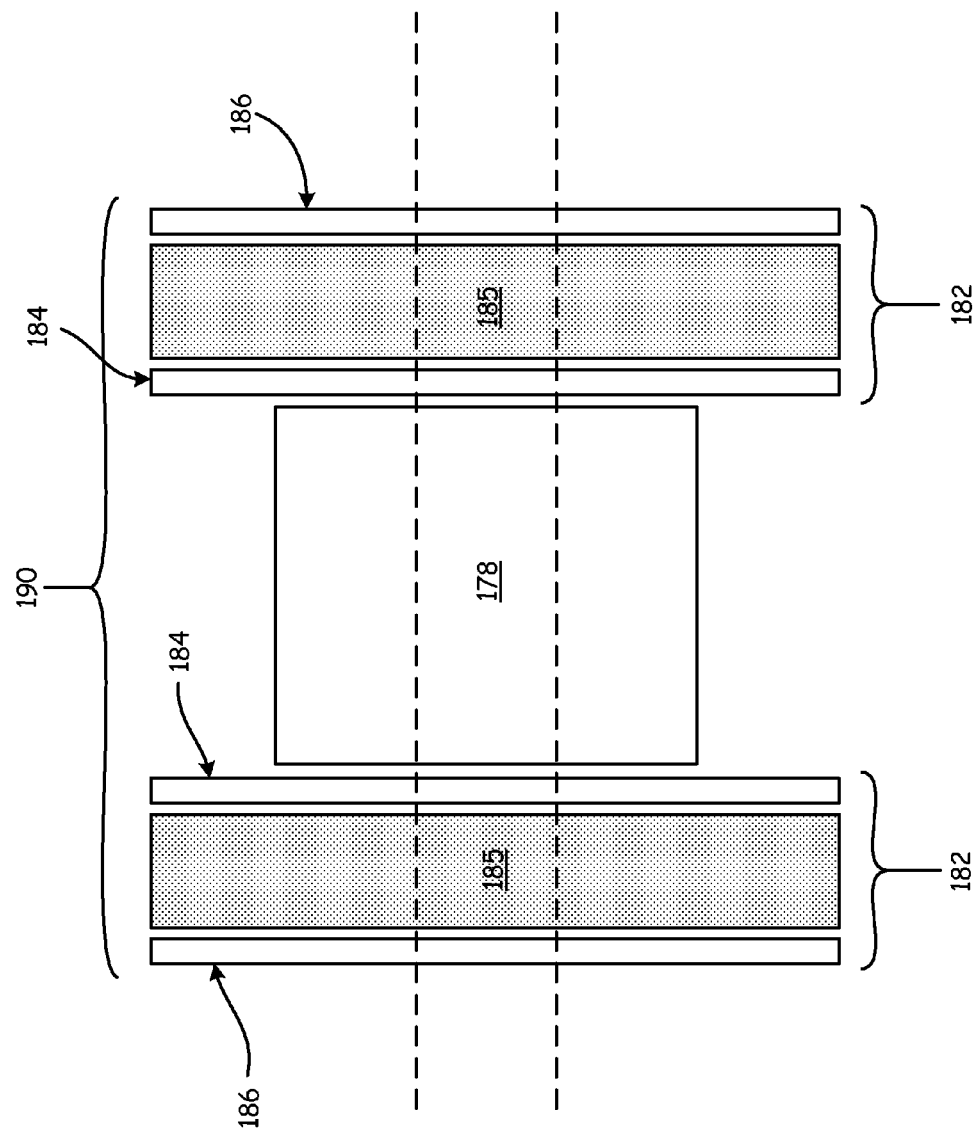
FIG. 4 illustrates a schematic diagram of a portion of the volumetric meter assembly, shown in FIG. 3.

FIG. 4 illustrates a schematic diagram of a metering assembly 190, in one example. In FIG. 4, components are illustrated in an exploded view. Metering assembly 190 comprises a roller element 178 and at least one guide assembly 182 located adjacent to, and in contact with roller element 178. While only one roller element 178 is shown, assembly 190 can include more than one roller element between a pair of guide assemblies 182.

As shown, two guide assemblies 182 are adjacently located to roller element 178, such that they engage opposing sides of the roller element 178. In one example, roller elements 178 and guide assemblies 182 can be replaced with other component sizes and combinations (e.g. for different product types and/or meter rates) by removing drive shaft 180 from frame 150.

Each guide assembly 182 comprises, in one example, at least one guide element 184, and a biasing element 185. Biasing element 185 is configured to exert a biasing force on guide element 184 toward roller element 178. In one example, element 185 comprises a compressible element (referred to as compressible element 185) and/or an element 186 that engages a surface of frame 150. Compressible element 185 is, in the illustrated example, resilient in that it returns to a normal, relaxed state after being compressed.

In one example, compressible element 185 comprises a compression-spring. One example is illustrated below in FIG. 6. In one example, compressible element 185 comprises a compressible, solid material. One example is illustrated below in FIG. 5.

While element 184 is illustrated as a separate component from element 185, in one example element 184 can be formed by a surface of element 185. In one example, element 184 and/or element 186 comprises solid plates, such as metal (e.g., stainless steel), plastic, or another suitable material. In one example, compressible element 185 is formed of a compressible, resilient material. In one example, element 185 comprises an elastic material such as, but not limited to, an elastomeric material. In one example, the compressible material comprises plastic. In one example, the compressible material comprises urethane foam. In one example, compressible element 185 exerts a biasing force of at least one pounds per square inch (psi) at a given deflection (e.g. 25% deflection). In one example, compression element 185 exerts a biasing force of at least two psi. In one example, compression element 185 exerts a biasing force of at least three psi at a given deflection. In one example, compression element 185 exerts a biasing force of at least four psi at a given deflection. In one example, compression element 185 exerts a biasing force of at least five psi.

Figure 5:
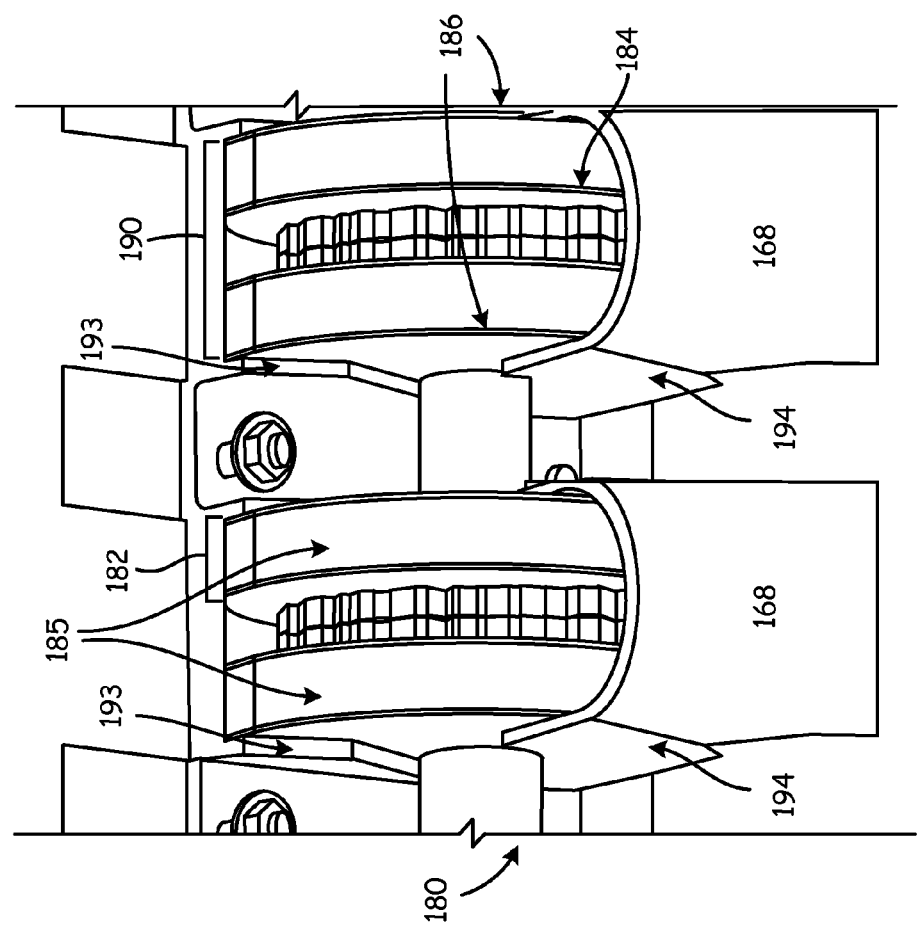
FIG. 5 illustrates a perspective view of a volumetric meter assembly, in one example.

FIG. 5 illustrates a perspective view of a portion of volumetric meter assembly 120, in one example. As shown, meter assembly 190 compressibly fits between adjacent frame protrusions 193 (or other suitable spacing elements), in one example. Alternatively, or in addition, metering assembly 190 compressibly fits within walls 194 of feed cup 168. In one example, frame protrusion 193 and feed cup wall 194 are formed of a single unitary body. In one example, the feed cup diameter is substantially similar to the distance between adjacent frame protrusions 193, such that both feed cup walls 194 and frame protrusions 193 provide a biasing force against elements 186. In a relaxed, uncompressed state, each metering assembly 190 has a width greater than the width between frame protrusions 193 and/or feed cup walls 194.

During operation of assembly 120, roller elements 178 and/or guide assemblies 182 are exposed to product in compartment 148 (shown in FIG. 3). As the roller elements 178 rotate, they convey product to feed cups 168. Guide assemblies 182 assist in guiding the product along the conveyance path. As such, guide assemblies 182 can act as a product barrier that prevents product from escaping the intended path of conveyance on the metering surface of roller element 178 and entering into other areas of meter assembly 120.

Figure 6:
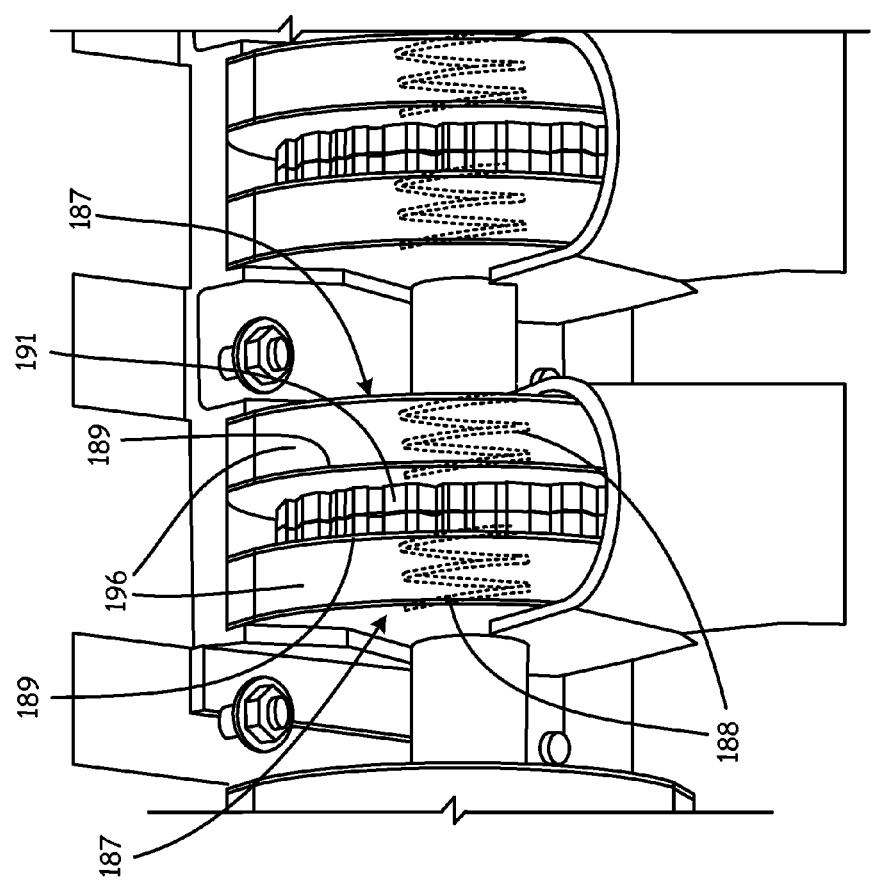
FIG. 6 illustrates a perspective view of a volumetric meter assembly, in one example.

FIG. 6 illustrates a perspective view of a volumetric meter assembly, in one example. In the example of FIG. 6, a compressible guide assembly 187 comprises a compression spring 188 (shown in phantom in FIG. 6). Spring 188 is configured to provide a biasing force on guide element 189 against a roller element 191. In the example illustrated in FIG. 6, assembly 187 comprises a product barrier 196 configured to prevent product from entering a space on an opposing side of element 189, that is opposite roller element 191. In one example, the product barrier 196 comprises a telescoping shield. In one example, the product barrier 196 comprises bellows. In one example, the product barrier 196 comprises a foam or other material having a cavity (such as a hollowed out portion) that accommodates spring 188. Of course, other suitable product barriers can also be utilized.

Figure 7:
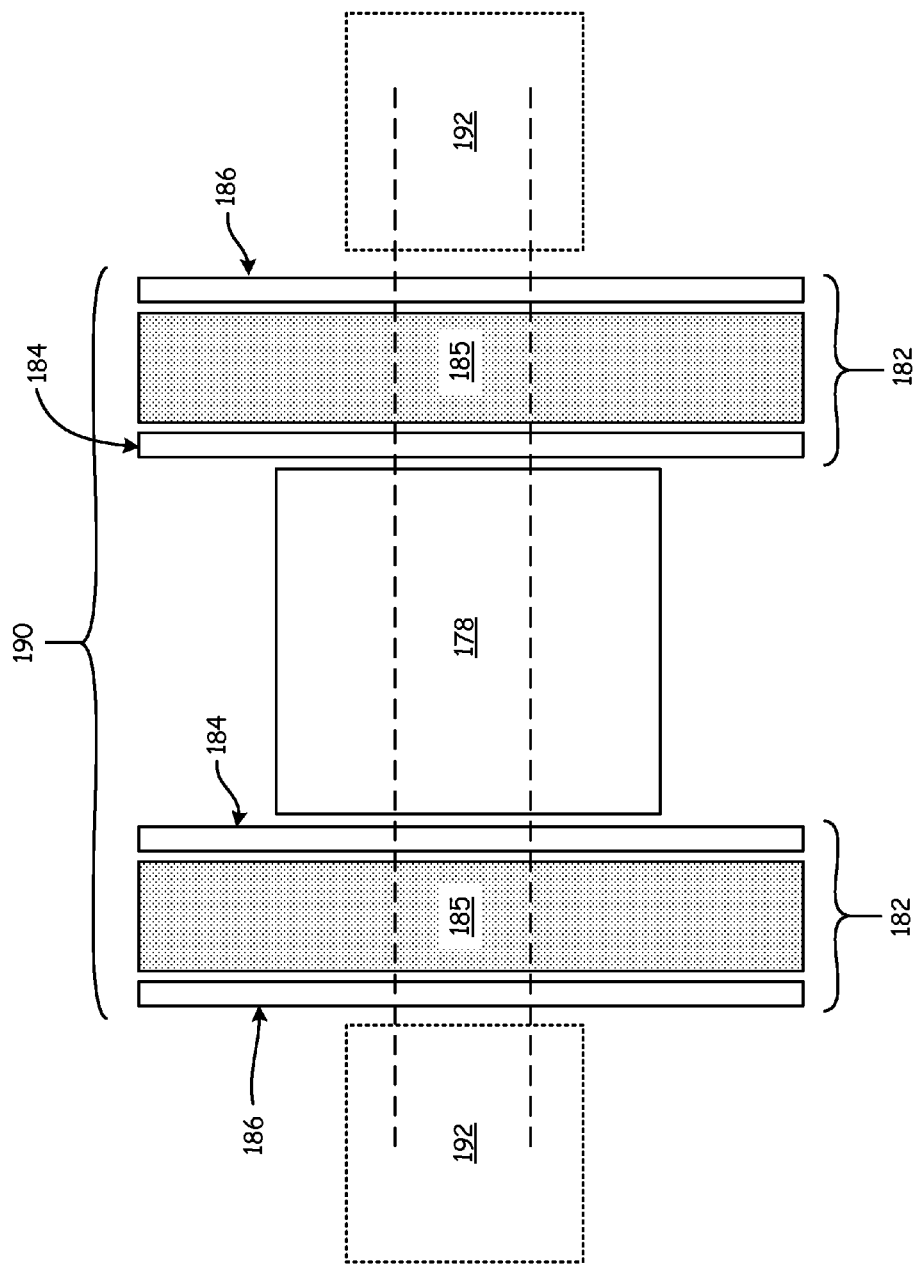
FIG. 7 illustrates a schematic diagram of a volumetric meter assembly, in one example.

FIG. 7 illustrates a schematic diagram of volumetric metering assembly 190, in one example. In FIG. 7, the components are illustrated in an exploded view. In the example of FIG. 7, guide assembly 182 compressibly fits between a spacer 192 and roller element 178. FIG. 7 illustrates a spacer 192 on either side of the assembly 195, however, in one example, there is only one spacer 192 between adjacent guide assemblies 182. In another example, multiple spacers 192 can be disposed between adjacent guide assemblies 182. Each spacer 192 maintains a defined distance between adjacent metering assemblies 190. Each spacer 192 comprises, in one example, a bushing-like device axially located on the drive shaft 180. In one example, spacer 192 is comprises a substantially incompressible spacing mechanism, such as a metal or plastic material. In one example, spacer 192 can comprise a compressible spacing mechanism, for example a compressible foam, or a compression spring. In one example, spacer 192 is attached to the frame 150 and not coupled to the drive shaft 180.

The guide assemblies shown in and described with respect to FIGS. 3-7 are by way of example only. Other suitable guide assemblies could be used.

It should also be noted that the different embodiments described herein can be combined in different ways. That is, parts of one or more embodiments can be combined with parts of one or more other embodiments. All of this is contemplated herein.

Example 1 is a volumetric metering system for metering a product in an agricultural machine, the system comprising a roller element, a drive mechanism configured to rotationally drive the roller element to convey the product along a conveyance path to a product receiving component, and a guide element disposed on a side of the roller element and configured to guide the product along the conveyance path, wherein the guide element is biased towards the roller element.

Example 2 is the volumetric metering system of any or all previous examples, wherein the guide element is spring-loaded.

Example 3 is the volumetric metering system of any or all previous examples, and further comprising a compressible element that biases the guide element toward the roller element.

Example 4 is the volumetric metering system of any or all previous examples, wherein the compressible element comprises plastic.

Example 5 is the volumetric metering system of any or all previous examples, wherein the compressible element comprises polyurethane.

Example 6 is the volumetric metering system of any or all previous examples, wherein the compressible element comprises a spring.

Example 7 is the volumetric metering system of any or all previous examples, wherein the guide element is a first guide element, and further comprising a second guide element on a second side of the roller element Example 8 is the volumetric metering system of any or all previous examples, wherein the second guide element is biased toward the roller element.

Example 9 is the volumetric metering system of any or all previous examples, wherein the second guide element comprises a second compressible element.

Example 10 is the volumetric metering system of any or all previous examples, wherein the product receiving component comprises a feed cup, and when the first and second compressible elements are in an uncompressed state, a combined axial length of the first guide element, the second guide element, the roller element, the first compressible element, and the second compressible element is greater than a width of the feed cup.

Example 11 is the volumetric metering system of any or all previous examples, wherein the guide element comprises one of metal or plastic.

Example 12 is the volumetric metering system of any or all previous examples, wherein the drive mechanism comprises a drive shaft, and further comprising a plurality of roller elements rotationally driven by the drive shaft, each roller element having at least one guide element biased into contact with the roller element.

Example 13 is the volumetric metering system of any or all previous examples, wherein the product receiving component comprises a flow path to a product distribution system configured to distribute the product to at least one end point.

Example 14 is a volumetric metering system for metering an agricultural product, the system comprising a drive shaft, a plurality of roller elements, each rotationally driven by the drive shaft to meter product, and a plurality of guide elements, each guide element disposed adjacent one of the plurality of roller elements and configured to guide the metered product along a conveyance path, wherein each of the guide elements is biased toward, and in contact with, the adjacent roller element.

Example 15 is the volumetric metering system of any or all previous examples, wherein each of the plurality of guide elements is biased by a compressible element.

Example 16 is the volumetric metering system of any or all previous examples, wherein the compressible element comprises a spring.

Example 17 is a guide assembly for a volumetric metering roller, the guide assembly comprising, a guide element, and a compressible element configured to bias the guide element towards the volumetric metering roller Example 18 is the guide assembly of any or all previous examples, wherein the compressible element comprises a solid, compressible material.

Example 19 is the guide assembly of any or all previous examples, wherein the compressible element comprises a spring.

Example 20 is the guide assembly of any or all previous examples, wherein the guide element comprises a first plate configured to contact the roller element, the guide assembly further comprising a second plate configured to contact a housing of the volumetric metering roller, and wherein the compressible element is disposed between the first and second plates.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A volumetric metering system for metering a product in an agricultural machine, the volumetric metering system comprising:
    a roller element;
    a drive mechanism configured to rotationally drive the roller element to convey the product along a conveyance path to a product receiving component;
    a first guide element disposed on a first side of the roller element and configured to guide the product along the conveyance path;
    a first compressible element that biases the first guide element towards the roller element; and
    a second guide element disposed on a second side of the roller element, wherein the second guide element is biased toward the roller element by a second compressible element.

2. The volumetric metering system of claim 1, wherein the first guide element comprises a plate configured to contact the roller element.

3. The volumetric metering system of claim 2, wherein the second guide element comprises a second plate configured to contact the roller element.

4. The volumetric metering system of claim 1, wherein at least one of the first or second compressible element comprises plastic.

5. The volumetric metering system of claim 4, wherein at least one of the first or second compressible element comprises polyurethane.

6. The volumetric metering system of claim 1, wherein at least one of the first or second compressible element comprises a compression coil-spring.

7. The volumetric metering system of claim 1, wherein at least one of the first or second guide element comprises a plastic.

8. The volumetric metering system of claim 1, wherein the product receiving component comprises a feed cup, and when the first and second compressible elements are in an uncompressed state, a combined axial length of the first guide element, the second guide element, the roller element, the first compressible element, and the second compressible element is greater than a width of the feed cup.

9. The volumetric metering system of claim 1, wherein at least one of the first or second guide element comprises a metal.

10. The volumetric metering system of claim 1, wherein the drive mechanism comprises a drive shaft, and further comprising a plurality of roller elements rotationally driven by the drive shaft, each roller element having at least one guide element biased into contact with the roller element.

11. The volumetric metering system of claim 1, wherein the product receiving component comprises a flow path to a product distribution system configured to distribute the product to at least one end point.

12. A volumetric metering system for metering an agricultural product, the volumetric metering system comprising:
    a drive shaft;
    a plurality of roller elements operably coupled to the drive shaft, wherein rotation of the drive shaft rotates each roller element to meter the agricultural product; and
    a plurality of sets of guide elements, each guide element set being associated with a particular one of the roller elements and comprising:
        first and second guide elements disposed on opposing sides of the particular roller element and configured to guide the agricultural product along a conveyance path, wherein the first guide element is biased in a first direction toward the particular roller element and the second guide element is biased in a second direction toward the particular roller element, the first direction being substantially opposite the second direction.

13. The volumetric metering system of claim 12, wherein each of the plurality of guide elements is biased by a compressible element.

14. The volumetric metering system of claim 12, wherein each guide element set comprises:
    a first compressible element configured to bias the first guide element in the first direction; and
    a second compressible element configured to bias the second guide element in the second direction.

15. A guide assembly for a metering roller, the guide assembly comprising:
    a first guide element;
    a second guide element;
    a first biasing element configured to bias the first guide element in a first direction towards a first side of the metering roller such that the first guide element is configured to angularly deflect in response to a change in the angle of the first side of the metering roller; and
    a second biasing element configured to bias the second guide element in a second direction towards a second side of the metering roller such that the second guide element is configured to angularly deflect in response to a change in the angle of the second side of the metering roller.

16. The guide assembly of claim 15, wherein at least one of the first or second biasing elements comprises a solid, compressible material.

17. The guide assembly of claim 15, wherein the first biasing element comprises a first compressible element configured to bias the first guide element in the first direction, and the second biasing element comprises a second compressible element configured to bias the second guide element in the second direction.

18. The guide assembly of claim 15, wherein the first guide element comprises a first plate configured to contact the first side of the metering roller, the guide assembly comprises a second plate configured to contact a housing of the metering roller, and the first biasing element is disposed between the first and second plates.

19. The guide assembly of claim 15, wherein the first and second guide elements are each configured to angularly deflect in response to lateral run-out of the metering roller.

20. The volumetric metering system of claim 12, wherein each of the plurality of guide elements are configured to angularly deflect to a corresponding angle of an adjacent side of the particular roller element.

* * * * *